(12) United States Patent
Ohmi et al.

(10) Patent No.: US 7,008,598 B2
(45) Date of Patent: Mar. 7, 2006

(54) REACTOR FOR GENERATING MOISTURE

(75) Inventors: Tadahiro Ohmi, Sendai (JP); Kouji Kawada, Osaka (JP); Nobukazu Ikeda, Osaka (JP); Akihiro Morimoto, Osaka (JP); Yukio Minami, Osaka (JP); Kenji Tubota, Osaka (JP); Teruo Honiden, Osaka (JP); Touru Hirai, Osaka (JP); Katunori Komehana, Osaka (JP); Keiji Hirao, Osaka (JP)

(73) Assignees: Fujikin Incorporated, Osaka (JP); Tadahiro OHMI, Sendai (JP)

( * ) Notice: Subject to any disclaimer, the term of this patent is extended or adjusted under 35 U.S.C. 154(b) by 0 days.

(21) Appl. No.: 10/884,917

(22) Filed: Jul. 7, 2004

(65) Prior Publication Data

US 2004/0247502 A1 Dec. 9, 2004

Related U.S. Application Data

(60) Division of application No. 09/905,209, filed on Jul. 12, 2001, now Pat. No. 6,919,056, which is a continuation of application No. PCT/JP00/03659, filed on Jun. 5, 2000.

(51) Int. Cl.
*B01J 8/02* (2006.01)

(52) U.S. Cl. ............... 422/211; 422/222; 422/240; 422/177; 422/180

(58) Field of Classification Search ........... 422/211, 422/214, 222, 240, 177, 180; 423/219, 248, 423/645, 580.1; 252/372; 502/439, 527.12
See application file for complete search history.

(56) References Cited

U.S. PATENT DOCUMENTS

| 6,093,662 | A | * | 7/2000 | Ohmi et al. | ........... 438/773 |
| 6,180,067 | B1 | * | 1/2001 | Ohmi et al. | ........... 422/190 |
| 6,274,098 | B1 | | 8/2001 | Tanabe et al. | |

(Continued)

FOREIGN PATENT DOCUMENTS

EP 0 878 443 A1 * 11/1998

(Continued)

*Primary Examiner*—Kevin P. Kerns
(74) *Attorney, Agent, or Firm*—Grifin & Szipl, P.C.

(57) ABSTRACT

A reactor for generating moisture wherein ignition of hydrogen gas, backfire to the gas supply source side, the peeling off of the platinum coat catalyst layer inside are prevented more completely to further increase the safety of the reactor for generating moisture and wherein the dead space in the interior space is reduced to further reduce the size of the reactor shell. The reactor comprises: a reactor shell A with an interior space formed with a reactor structural component on the inlet side and a reactor structural component on the outlet side opposed to and united with each other by welding, the reactor structural component 1 on the inlet side provided with a gas feed port 1a and the reactor structural component 2 on the outlet side provided with a moisture gas take-out port 2a; a reflector on the inlet side facing the gas feed port in the interior space of the reactor; a reflector on the outlet side facing the moisture gas take-out port in the interior space; and a platinum coat catalyst layer 8 formed on the inside wall of the reactor structural component on the outlet side, wherein hydrogen and oxygen fed into the interior space of the reactor through the gas feed port are brought into contact with the platinum coat 8b to activate the reactivity, thereby reacting hydrogen and oxygen into water in a non-combustion state.

20 Claims, 5 Drawing Sheets

U.S. PATENT DOCUMENTS

| | | | |
|---|---|---|---|
| 6,334,962 B1 * | 1/2002 | Minami et al. | 252/372 |
| 6,733,732 B1 * | 5/2004 | Ohmi et al. | 422/211 |
| 6,919,056 B1 * | 7/2005 | Ohmi et al. | 422/211 |
| 2002/0122758 A1 * | 9/2002 | Ohmi et al. | 422/211 |

FOREIGN PATENT DOCUMENTS

| | | |
|---|---|---|
| JP | 10-297907 | 11/1998 |
| JP | 10-297907 A * | 11/1998 |
| WO | WO 98/57884 A1 * | 12/1998 |

* cited by examiner

REACTOR FOR GENERATING MOISTURE

CROSS-REFERENCE TO INTERNATIONAL APPLICATION

This application is a divisional of U.S. patent application Ser. No. 09/905,209, filed Jul. 12, 2001, now U.S. Pat. No. 6,919,056 and which is a continuation of and claims the early filing date of International Application PCT/JP00/103659, filed Jun. 5, 2000, the entire disclosure of which is hereby incorporated by reference.

FIELD OF THE INVENTION

The present invention relates to improvements in a reactor for generating moisture used chiefly for semiconductor manufacturing facilities. More particularly, the present invention relates to a reactor for generating moisture which is improved in safety and service life by keeping the temperature from rising too high locally in the reactor, thereby completely preventing such troubles as ignition of hydrogen, backfiring and the peeling off of a platinum coat catalyst layer, which permits substantial reduction in manufacturing costs.

BACKGROUND OF THE INVENTION

Oxide film coating on silicon in a semiconductor manufacturing process requires 1,000 sccm (1,000 cc/minute under standard conditions) of high-purity moisture.

For that purpose and others, the present inventors had earlier developed a reactor for generation of moisture of a construction as shown in FIG. 6 and disclosed the same in Japanese patent application No. 10-297907.

In FIG. 6, the reference character A indicates a reactor shell; the numeral 1, a reactor structural component on an inlet side; the numeral 1a, a gas fed port; the numeral 2, a reactor structural component on an outlet side; the numeral 2a, a moisture gas take-out port; the numeral 3, an interior space on the inlet side; the numeral 4, an interior space on the outlet side; the numeral 5, a reflector on the inlet side; the numeral 6, a reflector on the outlet side; the numeral 7, a metal filter; and the numeral 8, a platinum coat catalyst layer 8.

The platinum coat catalyst layer 8 is provided on the inside surface of the reactor structural component 2 on the outlet side. The layer is formed of a barrier coat 8a, for instance, of TiN on the inside wall surface of the reactor structural component 2 on the outlet side and a platinum coat 8b fixed thereon.

To produce moisture, a mixed gas G prepared by mixing $H_2$ and $O_2$ at a specific ratio is fed into the reactor shell A. The mixed gas G fed into the interior space 3 on the inlet side of the reactor shell A is diffused by the reflector 5 on the inlet side and the metal filter 7, and flows into the interior space 4 on the outlet side. There, the mixed gas G comes in contact with the platinum coat 8b, which activates $O_2$ and $H_2$.

$H_2$ and $O_2$, which are activated in contact with the platinum coat 8b, react into moisture gas (water vapor) at a temperature of as high as about 300 to 500° C. The moisture gas (water vapor) thus produced flows out to the moisture gas take-out port 2a through the gap L between the reflector 6 and the reactor structural component 2 on the outlet side. From the moisture gas take-out port 2a, the moisture gas is then supplied to a process chamber (not shown) for semiconductor manufacturing facilities.

In the reactor shell A, where $O_2$ and $H_2$ react at a high temperature, the temperature in the interior spaces 3, 4 is maintained at a temperature below the ignition point of $H_2$ or an $H_2$-containing gas so that $H_2$ and $O_2$ are reacted at a proper rate to produce moisture gas at a specific flow rate while $H_2$ and $O_2$ are prevented from causing an explosive reaction.

The reactor shell A shown in FIG. 6 is very small in size but capable of producing high-purity moisture continuously at a desired flow rate and at a high reaction rate in a simple procedure. Thus, the reactor shell A is very practical and useful.

However, the reactor shell A shown in FIG. 6 has a number of problems yet to be solved. Among them, the problems requiring urgent solution are (1) ignition of $H_2$, and backfire from the gas feed port 1a to the gas supply source, and (2) partial peeling off and coming off of the platinum coat catalyst layer 8 owing to a local sudden rise in temperature in the reactor shell A.

As mentioned above, the temperature in the interior spaces of the reactor shell A is maintained at about 450 to 500° C.–the temperatures much lower than the lowest ignition point of $H_2$ or an $H_2$-containing gas. The lowest ignition point is about 560° C. and varies to some degree depending on the mixing ratio of $H_2$ and $O_2$. Thus, $H_2$ and $O_2$ are prevented from undergoing a sudden, explosive combustion reaction.

In practice, however, it is very difficult to keep the temperature below the lowest ignition point perfectly and continuously in the interior spaces 3, 4 of the reactor shell A. It can happen that the temperature rises above the lowest ignition point locally on the inside wall of the reactor structural component 1 on the inlet side, the reactor structural component 2 on the outlet side or the like for some reasons.

Even if the temperature rises above the lowest ignition point locally on the inside wall of the reactor structural component 1 on the inlet side or the reactor structural component 2 on the outlet side, $O_2$ and $H_2$ will not always undergo an explosive combustion reaction, causing a backfire toward the gas supply source. Usually, there is no ignition or backfiring. However, it can happen in rare cases that $H_2$ will be ignited or backfire to the gas supply source, especially if $H_2$ is present in a high concentration in the mixed gas G.

It is still not yet known what causes the temperature to rise locally and suddenly in the reactor structural components 1, 2, the metal filter 7 or the like, igniting $H_2$ or triggering a backfire.

The primary cause for ignition of $H_2$ is considered to be that $H_2$ and $O_2$ in the mixed gas G are activated by metallic catalytic action on the inside wall surface of the reactor structural component 1 on the inlet side, the outer surfaces of such other component parts of the reactor shell A as the reflector 5 on the inlet side, reflector 6 on the outlet side, metal filter 7 and the like, causing the temperature to rise too high locally and suddenly at the aforesaid inside wall or the like. This observation is based on the inventors' past experience in building and applying reactors for generation of moisture.

Such parts as the reactor structural component 1 on the inlet side, reflectors 5, 6 and metal filter 7 are all made of stainless steel under JIS designation SUS316L. The outer surfaces of those parts are covered with oxide film and passive state film of a variety of metals which are usually formed naturally. Those films restrict what is called catalytic reactivity that is usually observed on the surface of stainless steel.

If the aforesaid oxide film and passive state film are exposed to the mixed gas G containing $H_2$ in a high concentration at a temperature as high as 450 to 500° C. for a long time, the oxide film and the like can peel off or come off in some cases. In other cases, the oxide film can be reduced. As a result, the metal surface is locally exposed and bare. In addition, the metal catalytic activity on the outer surface of stainless steel is put to work, intensively accelerating a local reaction between $O_2$ and $H_2$. That will raise the temperature at local areas other than the portion provided with the platinum coat catalyst layer 8 in the interior spaces 3, 4 of the reactor shell A. Also, the temperature will rise above the lowest ignition point of $H_2$ or an $H_2$-containing gas.

Meanwhile, it is known that the temperature on the inside wall provided with the platinum coat catalyst layer 8 in the reactor structural component 2 on the outlet side rises high especially in the center of the reactor structural component 2 on the outlet side. Especially when the mixed gas G as used is diluted with $N_2$ to increase the flowing velocity and flow rate, the temperature will further rise in the portion from the periphery to the center of the reflector 6 on the outlet side.

If, therefore, the cause of the ignition and backfire to the gas supply source side lies in the inside wall provided with the platinum coat catalyst layer 8 of the reactor structural component 2 on the outlet side, the following theory may be set up. That is, with a sudden increase in the quantity of the mixed gas G flowing in the gap L, the reaction between $H_2$ and $O_2$ will be further activated in the part of the platinum coat catalyst layer 8 opposite to the peripheral edge of the reflector 6 on the outlet side. As a result, the temperature on the inside wall will suddenly rise to reach the lowest ignition point and ignite $H_2$ or cause the platinum coat catalyst layer 8 to partially come off.

One way that could be thought of to prevent the temperature from locally rising excessively in the interior spaces 3, 4 of the reactor shell A is to enlarge the reactor shell A to increase the thermal capacity and to provide a heat dissipation or cooling unit so as to raise the cooling capacity.

Yet, semiconductor manufacturing facilities are typically installed in a clean room and usually a large space for their installation is not available. Therefore, size reduction is an especially important requirement imposed on the reactor for generation of moisture auxiliary to the semiconductor manufacturing facilities. It is practically impossible to adopt the method by which the platinum coat catalyst layer 8 is prevented from the peeling off owing to local and sudden rise in temperature in the reactor for generation of moisture as mentioned above by enlarging the reactor shell A and providing a cooling unit.

The present invention addresses those problems with the prior art reactor for generation of moisture such that even if the temperature in the inside space of the reactor structural component 1 on the inlet side and the reactor structural component 2 on the outlet side of the reactor shell A is kept substantially lower than the lowest ignition point of $H_2$ or $H_2$-containing gas, $H_2$ is sometimes ignited, backfire to the gas supply source side occurs, or the platinum coat catalyst layer 8 will partially come off while moisture is being generated using the mixed gas with $H_2$ in a high concentration.

SUMMARY OF THE INVENTION

It is accordingly an object of this invention to provide a reactor for generation of moisture that can completely prevent ignition of $H_2$, backfire to the gas supply source side and peeling off of the platinum coat catalyst layer 8 while in operation. The problems are solved with a reactor for generation of moisture of a very small size and not by enlarging the reactor shell A to increase the thermal capacity or providing the reactor shell A with a large cooling unit to substantially increase the cooling capacity.

While looking into the problems of ignition of $H_2$ and backfire to the gas supply source side, it has been discovered that the ignition and backfire are caused in either of the following processes:

1) The oxide film or the like formed on the outer metal surface in the interior spaces of the reactor peels off and the catalytic activity of the metal surface is put to work. Because of the catalytic activity of the metal surface, the reaction of $O_2$ and $H_2$ locally proceeds violently and intensively, partly raising the temperature on the metal surface above the lowest ignition point of $H_2$-containing gas.

2) The temperature of the platinum coat catalyst layer 8 opposite to the peripheral edge portion of the reflector 6 on the outlet side rises locally above the lowest ignition point.

The inventors have also found that moisture can be generated at a high reaction rate even if such parts of the reactor shell A as the interior space 3 on the inlet side, reflector 5 on the inlet side and metal filter 7 are removed.

The present invention is built on the basis of those findings.

The invention according to a preferred embodiment comprises: a reactor shell with an interior space made with a reactor structural component on an inlet side and a reactor structural component on an outlet side disposed opposite to each other and joined together by welding, with the reactor structural component on the inlet side provided with a gas feed port and the reactor structural component on the outlet side provided with a moisture gas take-out port; a reflector on the inlet side positioned opposite the gas feed port in the interior space of the reactor; a reflector on the outlet side positioned opposite the moisture gas take-out port in the interior space; and a platinum coat catalyst layer formed on the inside wall of the reactor structural component on the outlet side, wherein hydrogen and oxygen fed into the interior space of the reactor through the gas feed port are brought into contact with the platinum coat catalyst layer to activate the reactivity, thereby reacting hydrogen and oxygen into water in a non-combustion state.

In the invention according to another embodiment, there is provided a round recession with a flat bottom formed on the inside walls of the reactor structural component on the inlet side and reactor structural component on the outlet side, wherein a tapered portion is formed at the peripheral edge portion of the inlet reflector on the side facing the bottom of the reactor structural component on the inlet side and also at the peripheral edge portion of the outlet reflector on the side facing the bottom of the reactor structural component on the outlet side, and wherein the reflector on the inlet side and the reflector on the outlet side are fixed on the reactor structural component on the inlet side and reactor structural component on the outlet side, each with a gap provided between the bottom and the reflector.

The invention of a still further embodiment comprises: a reactor shell with an interior space made with a reactor structural component on the inlet side and a reactor structural component on the outlet side disposed opposite to each other and joined together by welding, with the reactor structural component on the inlet side provided with a gas feed port and the reactor structural component on the outlet side provided with a moisture gas take-out port; a reflector facing the gas feed port and the moisture gas take-out port in the interior space of the reactor; and a platinum coat catalyst layer formed on the inside wall of the reactor structural component on the outlet side, wherein hydrogen and oxygen fed into the interior space of the reactor through the gas feed port are brought into contact with the platinum coat catalyst layer to activate the reactivity, thereby reacting hydrogen and oxygen into water in a non-combustion state.

In a yet further embodiment a round recession with a flat bottom is formed on the inside wall of the reactor structural component on the inlet side and reactor structural component on the outlet side, wherein the outside diameter of the aforesaid reflector is slightly smaller than the inside diameter of the recession, wherein a taper is formed on the peripheral edge portion of the reflector on the side facing the reactor structural component on the outlet side and wherein the aforesaid reflector is fixed on the reactor structural component on the outlet side with some gap provided between the reflector and the bottom.

The platinum coat catalyst layer is preferably formed of a barrier coat and a platinum coat.

Non-catalytic barrier coats are preferably formed on parts other than the area provided with the platinum coat catalyst layer and on the reflectors in the interior space of the reactor.

The barrier coat is preferably formed of a component selected from the group consisting of the compounds TiN, TiC, TiCN, TiAlN, $Al_2O_3$, $Cr_2O_3$, $SiO_2$ and CrN.

In another embodiment, the gas feed port of reactor structural component on the inlet side is provided with a material gas mixing and feeding unit to feed the material gas, that is, a mixed gas of hydrogen and oxygen.

In a further embodiment, the material gas mixing and feeding unit comprises a hydrogen feed pipe to feed hydrogen, an oxygen feed pipe to feed oxygen and a connector to join the downstream ends of the two feed pipes and connect the pipes to the material gas feed port and wherein the connector is so formed of a plurality of small-diameter pipe sections and large-diameter pipe sections that the small-diameter and large-diameter pipe sections are alternated to form a pipe.

In another embodiment a temperature regulator to heat and maintain the temperature at a specific level is provided on the outside wall of the reactor structural component on the inlet side and the reactor structural component on the outlet side.

In a yet further embodiment, the temperature regulator is a cooler to cool the reactor.

In yet another embodiment, the cooler is a range of cooling fins fixed on the outer surface of the reactor.

Further objects, features and advantages of the present invention will become apparent from the Detailed Description of Preferred Embodiments, which follows, when considered together with the attached Drawings.

LIST OF REFERENCE NUMERALS

Figure 1:
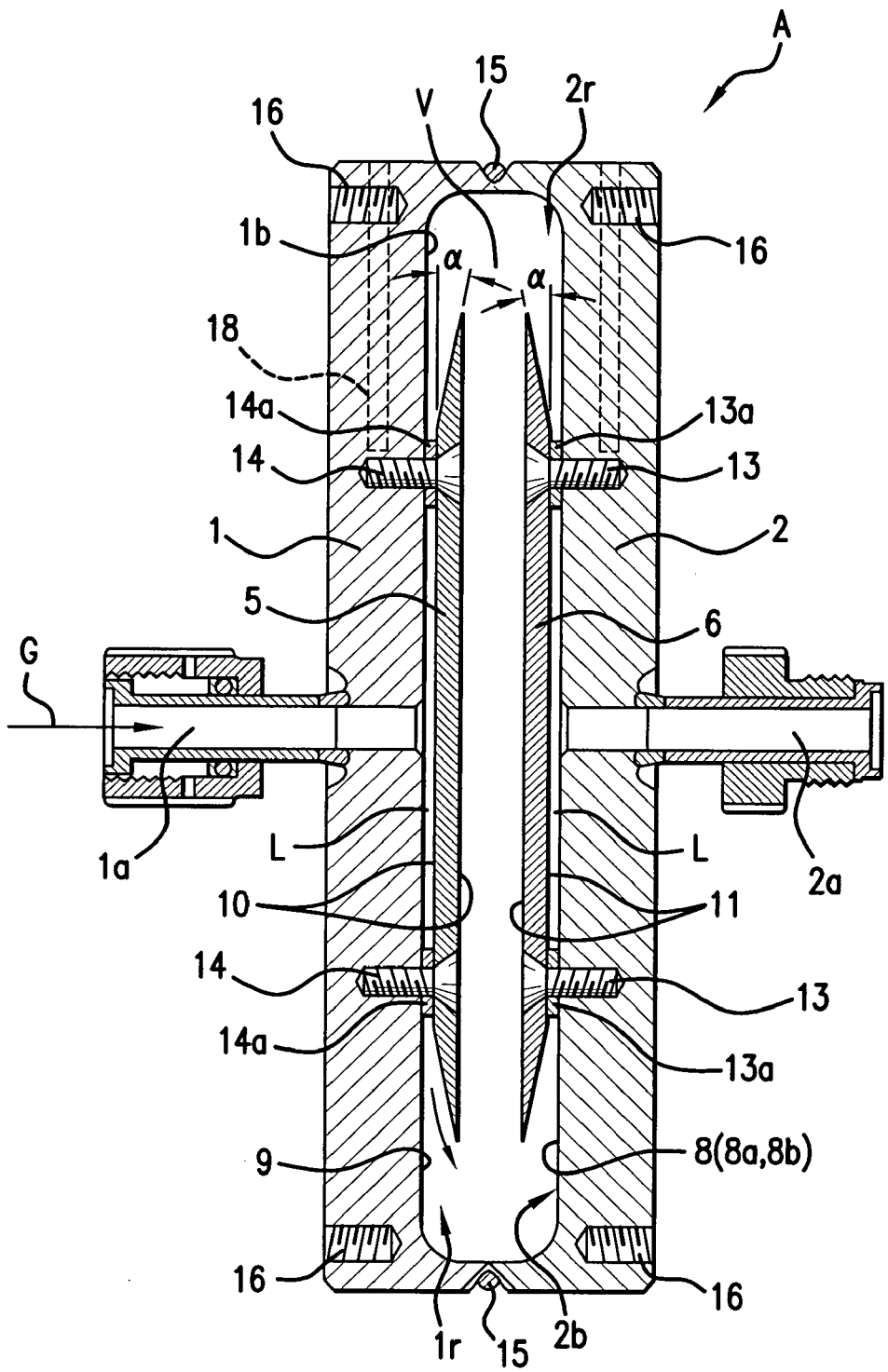
FIG. 1 is a vertical, sectional view of a reactor for generation of moisture according to a first embodiment of the present invention.

A reactor for generation of moisture
G mixed gas
V interior space
L gap
1 reactor structural component on the inlet side
1a gas feed port
2 reactor structural component on the outlet side
2a moisture gas take-out port
3 interior space on the inlet side
4 interior space on the outlet side
5 reflector on the inlet side
6 reflector on the outlet side
7 metal filter
8 platinum coat catalyst layer
8a barrier coat
8b platinum coat
9 barrier coat on the inside wall on the inlet side of the reactor structural component
10 barrier coat on the outer surface of the reflector on the inlet side
11 barrier coating on the outer surface on the outlet side
13 clamping bolt
13a spacer
14 clamping bolt
14a spacer
15 welding
16 fixing bolt hole
17 reflector
18 hole for mounting the sheath-type thermometer
19 barrier coat on the outer surface of the reflector material gas mixing and feeding unit
21 hydrogen feed pipe
22 oxygen feed pipe
23 connector
24 temperature regulator
25 heater
26 cooler
27 heater press
27a cooling fin

DESCRIPTION OF THE PREFERRED EMBODIMENTS

Hereinafter, the embodiments of the present invention will be described with reference to the drawings, in which like parts are referred to with like reference numerals.

Embodiment 1

FIG. 1 is a vertical, sectional view of a reactor for generation of moisture according to the first embodiment of the present invention. In FIG. 1, the reference letter A indicates a reactor; the letter V, an interior space; the letter L, a gap; the numeral 1, a reactor structural component on the inlet side; 1a, a gas feed port; 2, a reactor structural component on the outlet side; 2a, a moisture gas take-out port; 5, a reflector on the inlet side; 6, a reflector on the outlet side; 8, a platinum coat catalyst layer; 8a, a barrier coat; 8b, a platinum coat; and 9, 10, 11, represent barrier coats. Though not shown, the barrier coat is also formed on the outer surfaces of clamping bolts 13, 14 and the outer surface of the spacers 13a, 14a. Platinum coat 8b is formed on and around the area—with which the spacers 13a comes in contact—of the inside surface of the reactor structural component on the outlet side.

The reactor shell A is formed of reactor structural component 1 on the inlet side and reactor structural component 2 on the outlet side that face each other and are welded air-tight to form a circular and hollow disk. Components 1, 2 are made of stainless steel under JIS designation SUS316L.

The inside of the reactor structural component 1 on the inlet side has a circular recession with a flat bottom with which the gas feed port 1a communicates. Also, the inside of the reactor structural component 2 on the outlet side has a circular recession with a flat bottom with which the moisture gas take-out port 2a communicates. Furthermore, the two reactor structural components 1, 2 are each provided with an inward flange and are united airtight with weld 15 with the two flange bodies facing each other to form the reactor shell A.

In the first embodiment, the bottoms 1b and 2b respectively of the circular recessions 1r and 2r of the reactor structural components 1, 2 are flat. Needless to say, the bottoms 1b and 2b may be spherical in shape.

The reflector 5 on the inlet side is a disk body. With its center faced to the gas feed port 1a of the reactor structural component on the inlet side, the reflector 5 on the inlet side is fixed on the reactor structural component 1 by clamping bolts 14 with a gap L left between the bottom of the reactor structural component 1 and the reflector 5. The reflector 5 on the inlet side is made of stainless steel under JIS designation SUS316L and its diameter is set slightly smaller than the inside diameter of the recession.

Likewise, the reflector 6 on the outlet side is similar in shape to the reflector 5 on the inlet side. With its center facing the moisture gas take-out port 2a of the reactor structural component 2 on the outlet side, the reflector 6 on the outlet side is fixed on the reactor structural component 2 by clamping bolts 13 with a gap L left between the bottom of the reactor structural component 2 and the reflector 6.

The peripheral edges of the reflector 5 on the inlet side and the reflector 6 on the outlet side of the reactor structural components 1, 2 are tapered on the sides facing the reactor structural components 1, 2 at tapering angle α as shown in FIG. 1. Because of the taper at the tapering angle α on the reflector 5 on the inlet side, the mixed gas G flowing from the gas feed port 1a is diffused smoothly into the interior space V. At the reflector 6 on the outlet side, if the distance between the reflector 6 on the outlet side and the platinum coat catalyst layer 8 is uniform, heating will concentrate in the area near the portions of the platinum coat catalyst layer 8 to which the peripheral edges of the reflector face. The gradual narrowing of the gap L as shown in FIG. 1 prevents local concentration of heating. In the present embodiment, the reflectors 5, 6 are fixed by clamping bolts 13, 14. The reflectors 5, 6 may be welded to the reactor structural components using suitable supports (not shown).

In the present embodiment, the clamping bolts 13, 14 are spot-welded after being screwed up to prevent loosening.

It is also noted that the inside wall area near the spacer 13a of the reactor structural component 2 on the outlet side is not covered with the platinum coat 8b so as to prevent local heating of the clamping bolt 13, as mentioned above.

The mixed gas G jetted toward the reflector 5 on the inlet side through the gas feed port 1a collides against the surface of the reflector 5 on the inlet side and is then jetted through the gap L in the direction of the arrows and diffuses into the interior space V. The mixed gas G jetted in the interior space V collides with platinum coat catalyst layer 8 where the mixed gas G is catalytically activated. The mixed gas G then flows toward the moisture gas take-out port 2a through the gap L between the reflector 6 on the outlet side and the platinum coat catalyst layer 8.

Furthermore, while colliding against the platinum coat catalyst layer 8 and proceeding through the gap L, the mixed gas G, $H_2$ and $O_2$ are activated on contact with the catalyst layer 8, and then reacts to produce water under what are called non-combustion conditions.

Then, the moisture gas (water vapor) thus produced is led to the moisture gas take-out port 2a through the gap L between the reflector 6 on the outlet side and the platinum coat catalyst layer 8.

Figure 2:
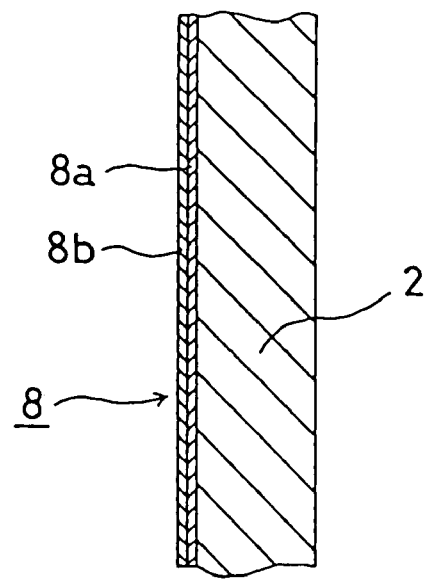
FIG. 2 is a partial, vertical, sectional view showing the formation of a platinum coat catalyst layer.

The platinum coat catalyst layer 8 is formed on the entire inside surface of the reactor structural component 2 on the outlet side made of stainless steel under JIS designation SUS316L (except for the area near the part with which the spacer 13a comes in contact). As shown in FIG. 2, the barrier coat 8a of TiN is first formed on the inside surface of the reactor structural component 2 on the outlet side and then the platinum coat 8b is formed on the barrier coat 8a. That is, the platinum coat catalyst layer 8 is formed of the barrier coat 8a and the platinum coat 8b.

Figure 3:
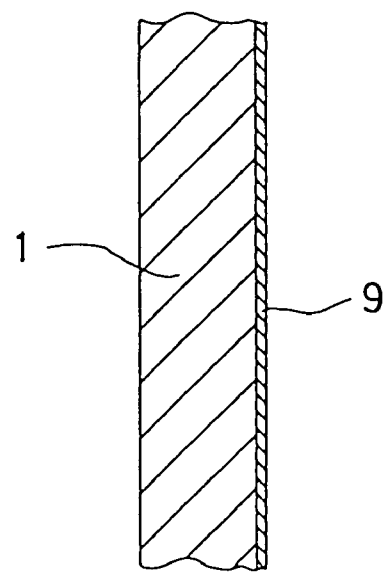
FIG. 3 is a partial vertical, sectional view showing the formation of a barrier coat.

The thickness of the platinum coat 8b is preferably 0.1 $\mu$m to 3 $\mu$m. In the present embodiment, the platinum coat 8b is about 1 $\mu$m in thickness. The thickness of the barrier coat 8a is preferably 0.1 $\mu$m to 5 $\mu$m. In the present embodiment, a barrier coat of TiN about 2 $\mu$m thick is formed. The barrier coat of TiN is formed not only on the reactor structural component 2 on the outlet side where the platinum coat catalyst layer 8 is formed but also on the inside surface of the reactor structural component 1 on the inlet side and the outer surfaces of the two reflectors 5, 6, as indicated at numerals 9, 10, 11 in FIG. 1. FIG. 3 shows a barrier coat 9 on the inside wall of the reactor structural component 1 on the inlet side.

In forming the respective barrier coats 8a, 9, 10, 11, the surfaces of the respective parts are treated properly to remove oxide films and passive state films of various metals naturally formed on the surface of the stainless steel. Then, the respective TiN barrier coats 8a, 9, 10, 11 are formed on the parts. In the present embodiment, TiN barrier coats 8a, 9, 10, 11 of about 2 $\mu$m thick are formed by an ion plating technique.

Materials other than TiN may also be used for the respective barrier coats 8a, 9, 10, 11. They include TiC, TiCN and TiAlN. Those materials are not catalytic and are excellent in resistance to reduction and oxidation.

Also, the barrier coats 8a, 9, 10, 11 are preferably 0.1 $\mu$m to 5 $\mu$m. A barrier coat with a thickness not greater than 0.1 $\mu$m is not sufficient in performance, while a barrier coat with a thickness greater than 5 $\mu$m takes much labor to form and could come off due to expansion difference in heating or the like.

Techniques other than ion plating for forming a barrier coat may be used. They include PVD such as ion sputtering and vacuum vapor deposition and chemical vapor deposition (CVD), hot press, and flame spray coating.

After formation of the barrier coat 8*a*, the reactor structural component 2 on the outlet side is coated with the platinum coat 8*b*. In the present embodiment, a platinum coat 8*b* about 1 μm in thickness is coated by an ion plating technique.

The thickness of the platinum coat 8*b* is preferably 0.1 μm to 3 μm. A coat not thicker than 0.1 μm cannot exhibit catalytic activity for a long time. On the other hand, if the thickness is larger than 3 μm, the cost of forming the platinum coat 8*b* will increase, although that will make little difference in catalytic activity and service life. Furthermore, the film can come off due to expansion difference in heating.

Techniques other than ion plating for forming a platinum coat 8*b* may be used. They include ion sputtering, vacuum vapor deposition and chemical vapor deposition (CVD) and hot press. If the barrier coat 8*a* is formed of such electric conductivity as TiN, plating is possible to use.

In the first embodiment of the present invention shown in FIG. 1 to FIG. 3, the reason the barrier coats 9, 10, 11 are formed on the inside surface of the reactor structural component 1 on the inlet side, the outer surface of the reflector 5 on the inlet side and the reflector 6 on the outlet side is that those parts 1, 5, 6 are not permitted to act as a catalyst.

Thus, the reactor structural component 1 on the inlet side, the reflector 5 on the inlet side, the reflector 6 on the outlet side and the like may be formed of a material that is not catalytic and resistant to reduction.

Embodiment 2

Figure 4:
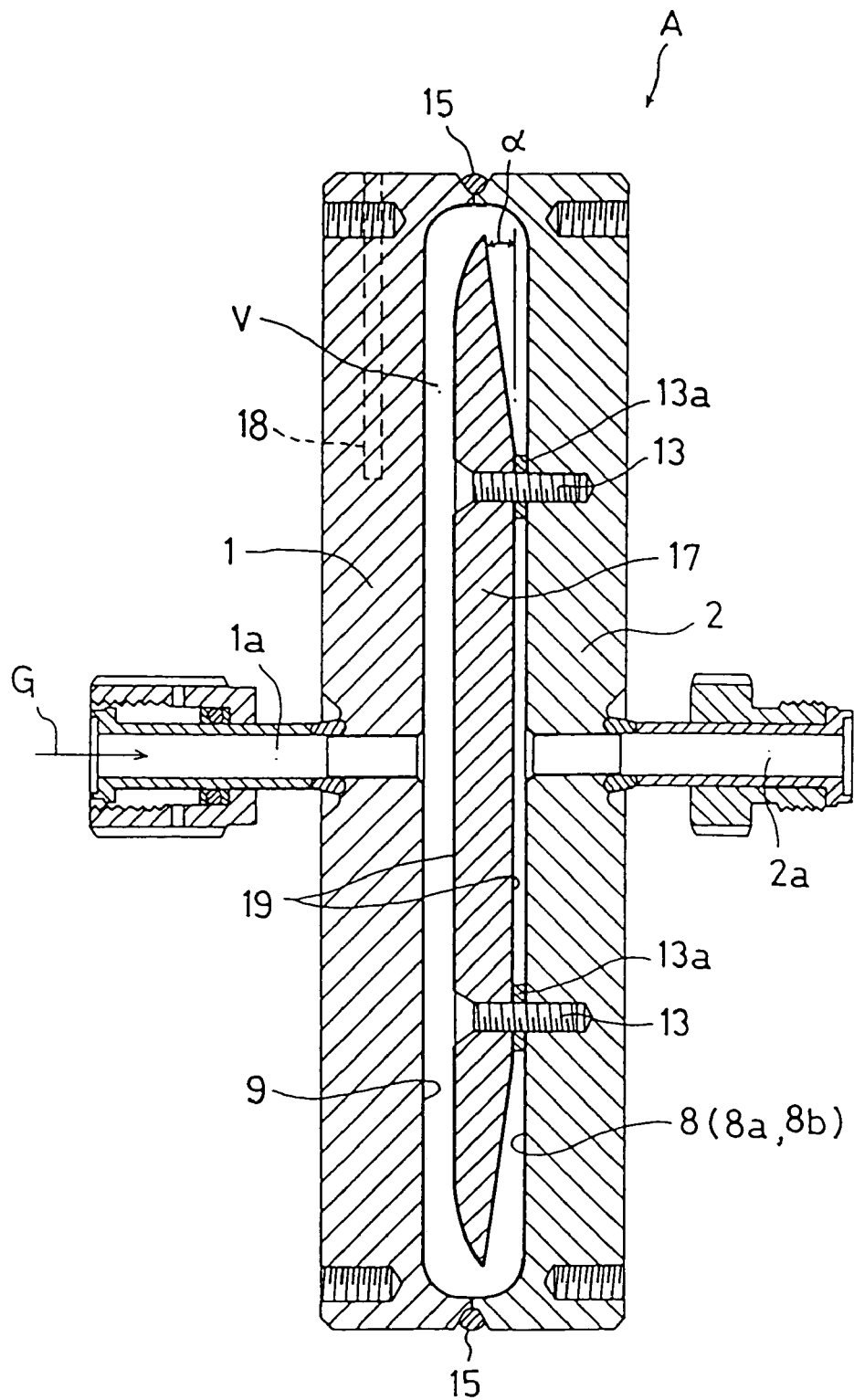
FIG. 4 is a vertical, sectional view of a reactor for generation of moisture according to a second embodiment of the present invention.

FIG. 4 is a vertical, sectional view of a reactor for generation of moisture according to the second embodiment of the present invention. In the second embodiment, one reflector 17 in the form of a board is fixed on the reactor structural component 2 on the outlet side by clamping bolts 13, 14 in the interior space V of the reactor shell A. The second embodiment is almost identical in construction with the first embodiment shown in FIG. 1 except that only one reflector 17 is used.

In FIG. 4, a hole 18 for mounting a sheath-type thermometer is shown. The sheath-type thermometer (not shown) is inserted in the reactor structural component 1 on the inlet side. A platinum coat catalyst layer 8 is formed on the inside wall of the reactor structural component 2 on the outlet side.

Furthermore, on the inner surfaces of the reactor structural component 1 on the inlet side, the outer surfaces of the reflector 17 and the like form barrier coats 9, 19.

The reflector 17 is made of a relatively thick material whose thickness is more than about ½ the thickness of the interior space V, for example. The overall form is disk-like with an outside diameter slightly smaller than the inside diameter of the interior space V. The peripheral side of the reflector 17 that faces the inside wall of the reactor structural component 2 on the outlet side is tapered at a tapering angle α.

In FIG. 4, the reactor structural components 1, 2 and the reflector 17 are made of stainless steel. The inner surfaces of the reactor structural component 1 on the inlet side and the outer surfaces of the reflector 17 are covered with the barrier coats 9, 19. As in the first embodiment, the reactor structural component 1 on the inlet side and reflector 17 may be formed of a non-catalytic material.

In the reactor shell A of the second embodiment, ignition of $H_2$ and backfire to the gas supply source side can be completely shut out. In addition, the reflector 17 is large in thermal capacity and can effectively prevent the temperature from rising excessively in the center of the platinum coat catalyst layer 8. Furthermore, the volume (that is, dead zone) of the interior space of the reactor shell A can be reduced. In other words, the size of the reactor shell A can be reduced. That also facilitates the replacement of gases when the mixing ratio of the material gas, that is, $O_2$ and $H_2$ is changed.

EXAMPLE 1

In the first embodiment shown in FIG. 1, the specifications of the reactor shell A were: the outside diameter 114 mm, the thickness 34 mm, the thickness of the interior space V 14 mm, the inside diameter of the interior space V 108 mm, the outside diameter of the reflector 5 on the inlet side and the reflector 6 on the outlet side 80 mm, the thickness of the same 2 mm, the gap L 1 mm, the length of the tapered surface 10 mm. The platinum coat catalyst layer 8: TiN barrier coat 5 μm+Pt coat 0.3 μm. The material of the barrier coats 9, 19 of the reactor structural component 1 on the inlet side and the two reflectors 5, 12: TiN (5 μm).

Moisture was generated using a material gas comprised of mixed gas G of $O_2$ and $H_2$ in which the content of $H_2$ was 20% rich continuously for more than 100 hours at 450 to 500° C. with sheath-type thermometers inserted at four points at the moisture generating rate of 1,000 sccm. No ignition of $H_2$, backfire or the peeling off of the platinum coat catalyst layer 8 resulted.

EXAMPLE 2

In the second embodiment shown in FIG. 4, the specifications of the reactor shell A were: the outside diameter 114 mm, the thickness 30 mm, the thickness of the interior space V 10 mm, the inside diameter of the interior space V 108 mm, the thickness of the reflector 6 mm, the outside diameter of the reflector 102 mm, the gap L between the reflector and the reactor structural component 2 on the outlet side 1 mm, the gap between the reflector and the reactor structural component 1 on the inlet side 3 mm, the length of the tapered surface 21 mm (tapering angle α=8°). The platinum coat catalyst layer 8 comprised TiN barrier coat 8*a* 5 μm+Pt coat 8*b* 0.3 μm. The material of the barrier coats 9, 19 of the reactor structural component 1 on the inlet side and the reflectors 17 comprised TiN (5 μm).

Moisture generating tests were carried out under almost the same conditions as in Example 1. No ignition of $H_2$, backfire or the peeling off of the platinum coat catalyst layer 8 resulted.

Embodiment 3

Figure 5:
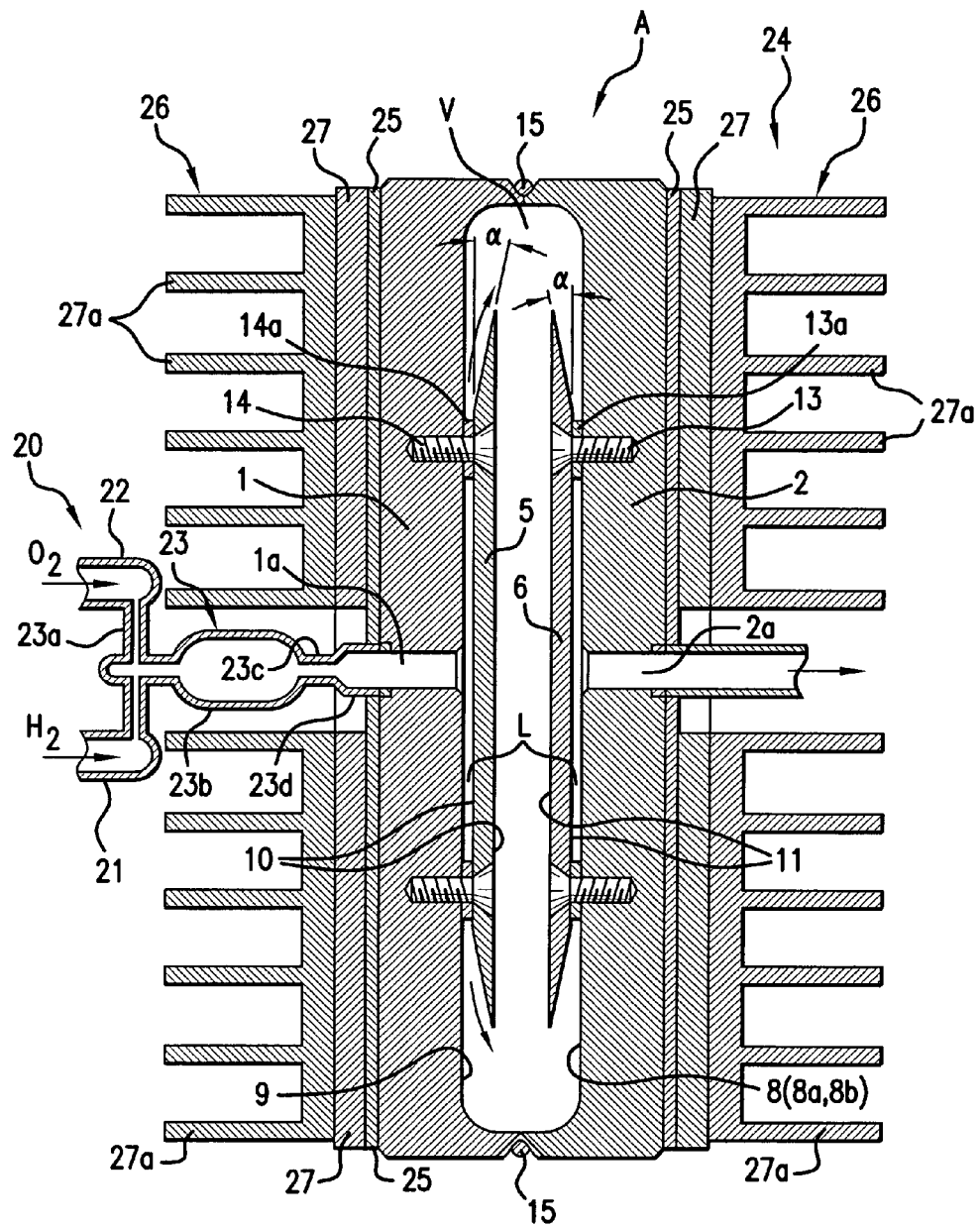
FIG. 5 is a vertical, sectional view of a reactor for generation of moisture according to a third embodiment of the present invention.
Figure 6:
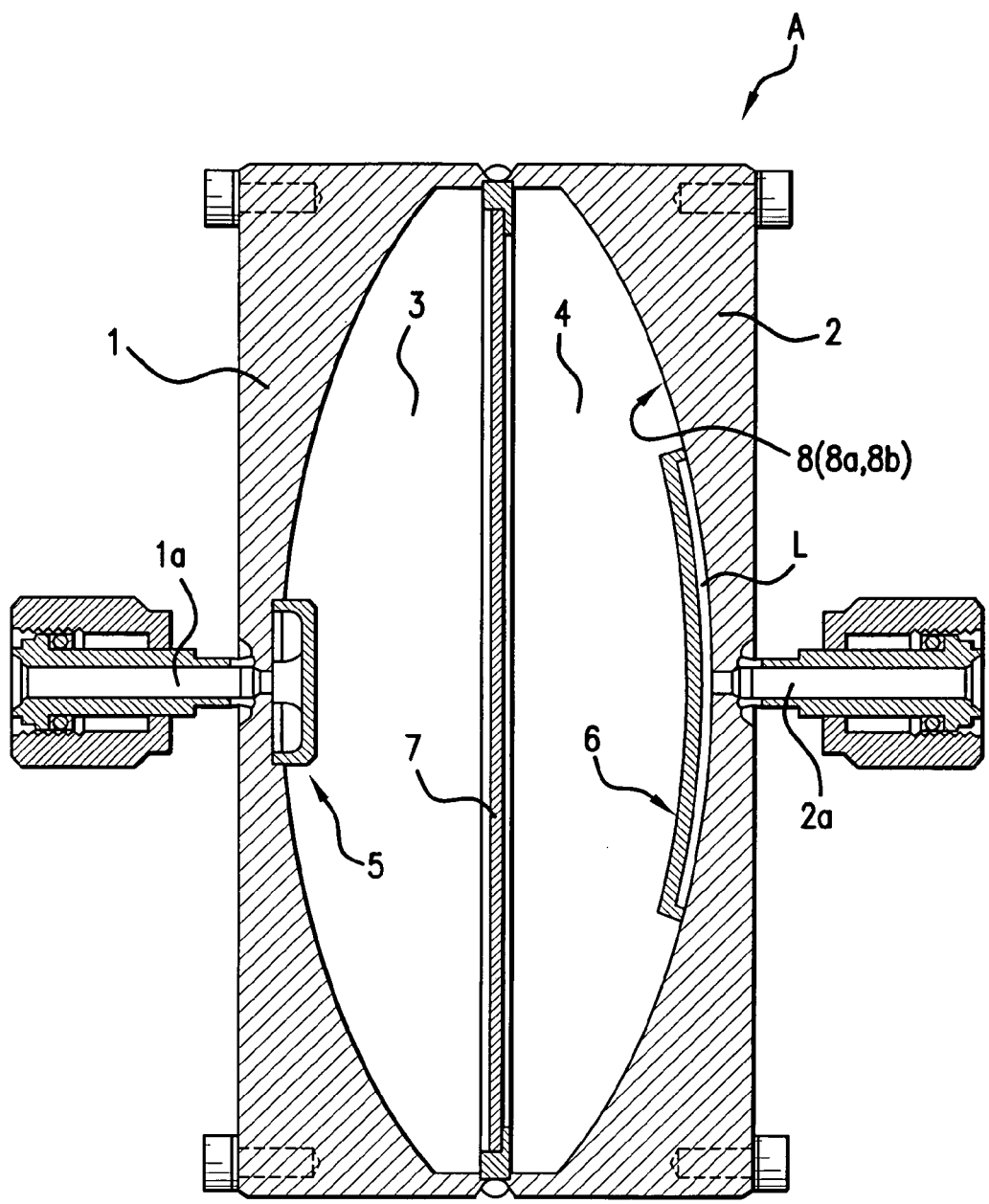
FIG. 6 is a vertical, sectional view of a prior art reactor for generation of moisture.

FIG. 5 is a vertical, sectional view of a reactor for generation of moisture according to the third embodiment of the present invention.

The third embodiment is made up of the reactor shell A of the first embodiment, a material gas mixing and feeding unit 20 and a temperature regulator 24 attached to the reactor shell A. That is, the reactor shell A of the third embodiment is exactly the same as that shown in FIG. 1.

In the third embodiment, the reactor shell A shown in FIG. 1 is used. Alternatively, the reactor shell A of the second embodiment shown in FIG. 4 may be used.

The material gas mixing and feeding unit 20 includes a hydrogen feed pipe 21, an oxygen feed pipe 22 and a connector 23 to join the downstream ends of the two feed pipes and connect the pipes 21, 22 to the material gas feed port 1*a* of the reactor structural component 1 on the inlet side.

The connector 23 is formed of a plurality of small-diameter pipe sections 23a, 23c and large-diameter pipe sections 23b, 23d. The small-diameter and large-diameter pipe sections are alternated to form a pipe.

The second large-diameter pipe section 23d is fixed to the gas feed port 1a of the reactor structural component 1 on the inlet side by welding, for example.

The temperature regulator 24 heats the reactor shell A to a specific temperature and maintains the same at that temperature. As shown in FIG. 5, the temperature regulator 24 comprises heaters 25 to heat the reactor structural component 1 on the inlet side and the reactor structural component 2 on the outlet side, a controller (not shown) to turn on or off the heaters 25, and coolers 26 to cool the reactor shell A.

The heater 25 is a so-called rabbit heater attached to and fixed on the reactor shell A by a disk-shaped heater press 27. The controller maintains the reactor shell A at a specific temperature (reactor temperature) by turning the heater 25 on or off. The specific temperature is a temperature that is lower than the ignition point of the hydrogen-mixed gas and at which hydrogen and oxygen react efficiently. This temperature is set preferably not higher than 400° C. Furthermore, the cooler 26 is attached to the heater press 27. The cooler 26 has a range of fins like a comb and prevents the reactor temperature from getting too high because of heating by a reaction between hydrogen and oxygen so as to stabilize the moisture generating reaction.

In the present invention, areas other than the part coated with the platinum coat catalyst layer 8 in the interior space V of the reactor shell A are covered with the non-catalytic barrier coat 8a that is excellent in resistance to reduction and oxidation. Therefore, there is no fear that the catalytic metal surface is exposed bare while the reactor is in operation. As a result, even if moisture is generated using a mixed gas G with 1–12 in high concentration for a long time, there is no possibility that $O_2$ and $H_2$ will violently react locally because of catalytic action of the metal surface other than the platinum coat catalyst layer 8. Thus, the possibility of ignition of $H_2$ and backfire to the gas supply source side, which could happen with the prior art reactor, can be completely precluded.

It is also pointed out that one reflector 17, or two reflectors 5 and 6, are provided and since no metallic filter is put up unlike in the prior art, reflectors relatively large in outside diameter and thickness can be used. That is effective in preventing the temperature from rising too high in the center of the platinum coat catalyst layer 8 and can eliminate the possibility of the platinum coat catalyst layer 8 from coming off locally.

Furthermore, the reactor is so configured that the respective reflectors are thicker with a larger outside diameter and with the peripheral edge portion tapered at tapering angle α. That increases the thermal capacity of the reflector and can effectively prevent the temperature from rising excessively in the center of the platinum coat catalyst layer 8. In addition, the dead space in the interior space V of the reactor shell A can be reduced, which facilitates replacement of gases in the reactor. That makes it possible to produce moisture at a small flow rate using a diluted gas and to further reduce the size of the reactor shell A.

In addition, the peripheral edge portions of the respective reflectors are tapered at tapering angle α, which prevents the temperature from rising locally on the peripheral portion of the platinum coat catalyst layer 8.

In case the material gas mixing and feeding unit 20 is provided, the material gas G with oxygen and hydrogen well mixed is fed to the gas feed port 1a through the connector 23. This improves the reaction response characteristic of hydrogen and oxygen and further raises the moisture generation reaction rate.

If the temperature regulator 24 is provided, the heater 25 works to maintain the reactor shell A at 400 to 450° C. even in the initial stage of operation of the reactor shell A. Thus, a high degree of moisture generation reaction rate between hydrogen and oxygen can be obtained beginning with the initial stage of operation of the reactor shell A.

Furthermore, the cooler 26, including the cooling fins 27a, is attached to the reactor shell A so as to accelerate heat dissipation. Even if the temperature of the reactor shell A rises because of moisture generation reaction, the reactor shell A will be maintained at a proper temperature through heat dissipation.

While the present invention has been illustrated by means of several preferred embodiments, one of ordinary skill in the art will recognize that additions, deletions, substitutions and improvements can be made while remaining within the scope and spirit of the invention as defined by the attached claims.

What is claimed is:

1. A reactor for generating moisture, comprising:
a reactor shell with an inlet side and an outlet side, wherein said reactor shell comprises:
a reactor structural component on the inlet side; and
a reactor structural component on the outlet side;
wherein an interior space is formed with said reactor structural component on the inlet side and said reactor structural component on the outlet side disposed opposite to each other and joined together by welding;
a gas feed port engaged with said reactor structural component on the inlet side;
a moisture gas take-out port engaged with said reactor structural component on the outlet side;
a reflector positioned opposite said gas feed port and said moisture gas take-out port in the interior space of said reactor; and
a platinum coat catalyst layer formed on the inside wall of said reactor structural component on the outlet side;
wherein hydrogen and oxygen are fed into the interior space of said reactor through said gas feed port and brought into contact with said platinum coat catalyst layer to activate the reactivity of the hydrogen and oxygen, thereby reacting the hydrogen and oxygen into water in a non-combustion state; wherein
a round recession with a flat bottom is formed on inside walls of said reactor structural component on the inlet side and said reactor structural component on the outlet side; wherein the outside diameter of said reflector is slightly smaller than the inside diameter of the recession; wherein a taper is formed on the peripheral edge portion of said reflector on the side facing said reactor structural component on the outlet side; and wherein a gap is formed between said reflector and the inside wall of said reactor structural component on the outlet side; and
wherein there is no filter in the interior space.

2. A reactor as defined in claim 1, wherein said platinum coat catalyst layer comprises a non-catalytic barrier coat and a platinum coat.

3. A reactor as defined in claim 2, wherein said barrier coat is formed of a component selected from the group consisting of TiN, TiC, TiCN, TiAlN, $Al_2O_3$, $Cr_2O_3$, $SiO_2$ and CrN.

4. A reactor as defined in claim 1, wherein said reactor further comprises a non-catalytic barrier coat formed on parts not provided with the platinum coat catalyst layer in the interior space of said reactor and on said reflectors reflector.

5. A reactor as defined in claim 4, wherein said barrier coat is formed of a component selected from the group consisting of TiN, TiC, TiCN, TiAlN, $Al_2O_3$, $Cr_2O_3$, $SiO_2$ and CrN.

6. A reactor as defined in claim 1, wherein said gas feed port is provided with a material gas mixing and feeding unit for feeding a mixed gas of hydrogen and oxygen.

7. A reactor as defined in claim 6, wherein said material gas mixing and feeding unit comprises a hydrogen feed pipe for feeding hydrogen, an oxygen feed pipe for feeding oxygen and a connector for joining the downstream ends of the two feed pipes and connecting the feed pipes to said material gas feed port; and wherein the connector formed of a plurality of small-diameter pipe sections and large-diameter pipe sections, and that small-diameter and large-diameter pipe sections are alternated to form a pipe.

8. A reactor as defined in claim 1, wherein said reactor further comprises a temperature regulator for heating and maintaining the temperature at a specific level; and wherein said temperature regulator is provided on the outside walls of said reactor structural component on the inlet side and said reactor structural component on the outlet side.

9. A reactor as defined in claim 8, wherein said temperature regulator is provided with a cooler for cooling said reactor shell.

10. A reactor as defined in claim 9, wherein said cooler is cooling fins fixed on the outer surface of said reactor shell.

11. A reactor for generating moisture, comprising:
a reactor shell with an inlet side and an outlet side, wherein the reactor shell comprises:
a reactor structural component on the inlet side; and
a reactor structural component on the outlet side;
wherein an interior space is formed with the reactor structural component on the inlet side and the reactor structural component on the outlet side disposed opposite to each other and joined together by welding;
a gas feed port engaged with the reactor structural component on the inlet side, wherein the gas feed port is provided with a material gas mixing and feeding unit for feeding a mixed gas of hydrogen and oxygen;
a moisture gas take-out port engaged with the reactor structural component on the outlet side;
a reflector positioned opposite the gas feed port and the moisture gas take-out port in the interior space of the reactor; and
a platinum coat catalyst layer formed on the inside wall of the reactor structural component on the outlet side; wherein
a round recession with a flat bottom is formed on inside walls of the reactor structural component on the inlet side and the reactor structural component on the outlet side; wherein the outside diameter of the reflector is slightly smaller than the inside diameter of the recession; wherein a taper is formed on the peripheral edge portion of the reflector on the side facing the reactor structural component on the outlet side; and wherein a gap is formed between the reflector and the inside wall of the reactor structural component on the outlet side; and
wherein hydrogen and oxygen are fed into the interior space of the reactor through the gas feed port and brought into contact with the platinum coat catalyst layer to activate the reactivity of the hydrogen and oxygen, thereby reacting the hydrogen and oxygen into water in a non-combustion state.

12. A reactor as defined in claim 11, wherein said material gas mixing and feeding unit comprises a hydrogen feed pipe for feeding hydrogen, an oxygen feed pipe for feeding oxygen and a connector for joining the downstream ends of the two feed pipes and connecting the feed pipes to said material gas feed port; and wherein the connector formed of a plurality of small-diameter pipe sections and large-diameter pipe sections, and that small-diameter and large-diameter pipe sections are alternated to form a pipe.

13. A reactor as defined in claim 11, wherein said reactor further comprises a temperature regulator for heating and maintaining the temperature at a specific level; and wherein said temperature regulator is provided on the outside walls of said reactor structural component on the inlet side and said reactor structural component on the outlet side.

14. A reactor as defined in claim 13, wherein said temperature regulator is provided with a cooler for cooling said reactor shell.

15. A reactor as defined in claim 14, wherein said cooler is cooling fins fixed on the outer surface of said reactor shell.

16. A reactor as defined in claim 11, wherein said platinum coat catalyst layer comprises a non-catalytic barrier coat and a platinum coat.

17. A reactor as defined in claim 16, wherein said barrier coat is formed of a component selected from the group consisting of TiN, TiC, TiCN, TiAlN, $Al_2O_3$, $Cr_2O_3$, $SiO_2$ and CrN.

18. A reactor as defined in claim 11, wherein said reactor further comprises a non-catalytic barrier coat formed on parts not provided with the platinum coat catalyst layer in the interior space of said reactor and on said reflector.

19. A reactor as defined in claim 18, wherein said barrier coat is formed of a component selected from the group consisting of TiN, TiC, TiCN, TiAlN, $Al_2O_3$, $Cr_2O_3$, $SiO_2$ and CrN.

20. A reactor for generating moisture, comprising:
a reactor shell with an inlet side and an outlet side, wherein the reactor shell comprises:
a reactor structural component on the inlet side; and
a reactor structural component on the outlet side;
wherein an interior space is formed with the reactor structural component on the inlet side and the reactor structural component on the outlet side disposed opposite to each other and joined together by welding;
a gas feed port engaged with the reactor structural component on the inlet side;
a moisture gas take-out port engaged with the reactor structural component on the outlet side;
a reflector positioned opposite the gas feed port and the moisture gas take-out port in the interior space of the reactor, wherein there is no filter in the interior space and the reflector has a thickness of more than about ½ a thickness of the interior space; and
a platinum coat catalyst layer formed on the inside wall of the reactor structural component on the outlet side;
wherein hydrogen and oxygen are fed into the interior space of said reactor through said gas feed port and brought into contact with said platinum coat catalyst layer to activate the reactivity of the hydrogen and oxygen, thereby reacting the hydrogen and oxygen into water in a non-combustion state.

* * * * *